United States Patent
Suito et al.

(10) Patent No.: US 6,529,679 B1
(45) Date of Patent: Mar. 4, 2003

(54) INFORMATION PROCESSING APPARATUS AND METHOD AS WELL AS PROVIDING MEDIUM

(75) Inventors: Taro Suito, Kanagawa (JP); Masashi Ohta, Tokyo (JP); Toshimichi Hamada, Tokyo (JP); Koichi Chotoku, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/325,183

(22) Filed: Jun. 3, 1999

(30) Foreign Application Priority Data

Jun. 5, 1998 (JP) .......................................... 10-157777

(51) Int. Cl.$^7$ ................................................. H04N 5/91
(52) U.S. Cl. ............................. 386/68; 386/125; 386/46
(58) Field of Search ..................... 386/46, 68, 125–126, 386/70; 369/30.23, 30.04; H04N 5/91

(56) References Cited

U.S. PATENT DOCUMENTS

| | | | | |
|---|---|---|---|---|
| 5,974,006 A | * | 10/1999 | Nakabo | 369/30.23 |
| 6,061,308 A | * | 5/2000 | Nakamizo | 369/30.04 |
| 6,160,954 A | * | 12/2000 | Ogawa | 386/111 |
| 6,343,180 B1 | * | 1/2002 | Kim | 386/126 |
| 6,360,055 B1 | * | 3/2002 | Kaneshige et al. | 386/70 |

* cited by examiner

Primary Examiner—Vincent Boccio
(74) Attorney, Agent, or Firm—Frommer Lawrence & Haug LLP; William S. Frommer

(57) ABSTRACT

The invention provides an information processing apparatus and method as well as a providing medium by which a period for reproduction of reproduction data at fixed intervals can be calculated to reproduce the reproduction data in a fixed period. First, a TOC of reproduction data is read out and a frame number of the reproduction data is calculated. Then, a readout time within which the reproduction data for one frame are read out from a recording medium is calculated. Thereafter, a sum total of reading position movement times when the reproduction data for L frames are read out is calculated. Then, a sum total of reproduction processing waiting times when the reproduction data for the L frames are read out is calculated. Then, the sum totals of the readout times, reading position movement times and reproduction processing waiting times are added to calculate a total time. Finally, a reproduction data transfer period is calculated based on the total time, and reproduction of the reproduction data is performed at time intervals corresponding to the reproduction data transfer period.

6 Claims, 5 Drawing Sheets

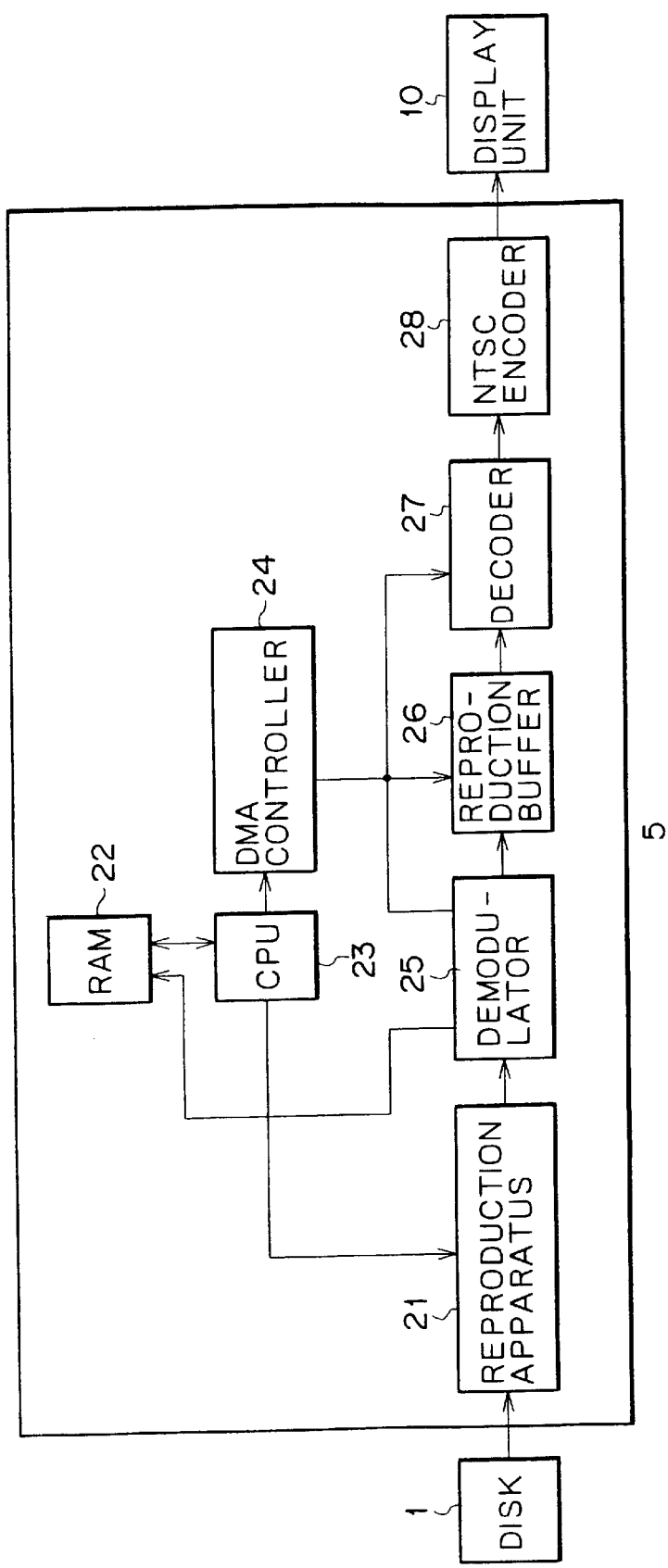

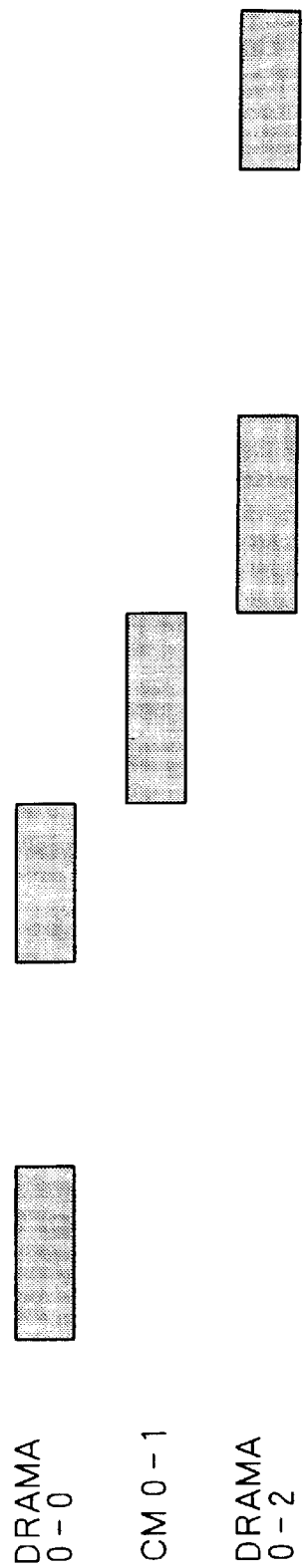

FIG. 3

| TIME CODE | FILE NAME | POSITION FROM THE TOP | CHARACTERISTIC POINT INFORMATION | SECTOR NUMBER | LINK INFORMATION | PHYSICAL ADDRESS |
|---|---|---|---|---|---|---|
| 00:00:00:00~00:05:02:15 | DRAMA 0-0 | 0 | I | 0 | 1 | Track 0:address 0 |
| | | | BB | 1 | 2 | Track 0:address 10 |
| | | | P | 2 | 3 | Track 0:address 20 |
| | | | B | 3 | 4 | Track 0:address 30 |
| | | | B | 11 | 12 | Track 0:address 110 |
| | | | P | 12 | 13 | Track 0:address 120 |
| | | | BB | 13 | fff | Track 0:address 130 |
| | | | P | 14 | 15 | Track 0:address 140 |
| 00:05:02:15~00:09:28:22 | CM 0-1 | 3402 | I | 15 | 16 | Track 0:address 150 |
| | | | P | 16 | 17 | Track 0:address 160 |
| | | | P | 17 | fff | Track 1:address 0 |
| | | | P | 18 | 19 | Track 1:address 10 |
| 00:00:00:00~00:05:02:15 | DRAMA 0-2 | 85004 | I | 19 | 20 | Track 1:address 20 |
| | | | BB | 20 | 21 | Track 1:address 30 |
| | | | P | 21 | 27 | Track 1:address 40 |
| | | | B | 27 | 28 | Track 1:address 50 |
| | | | B | 28 | 29 | Track 2:address 0 |
| | | | P | 29 | fff | Track 2:address 10 |
| | | | | | | Track 2:address 20 |

CHARACTERISTIC POINT FILE / FILE SYSTEM

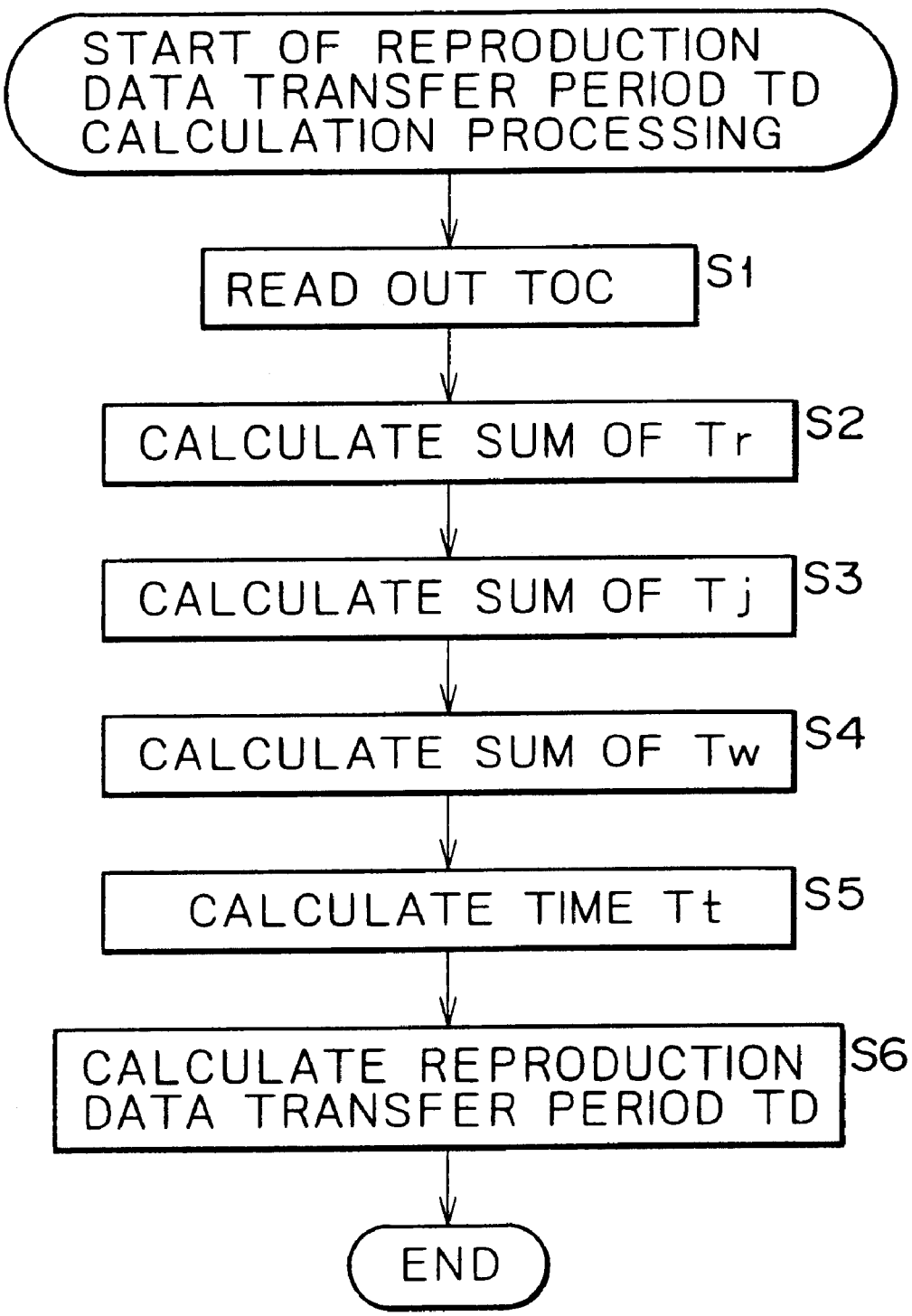

F I G. 5
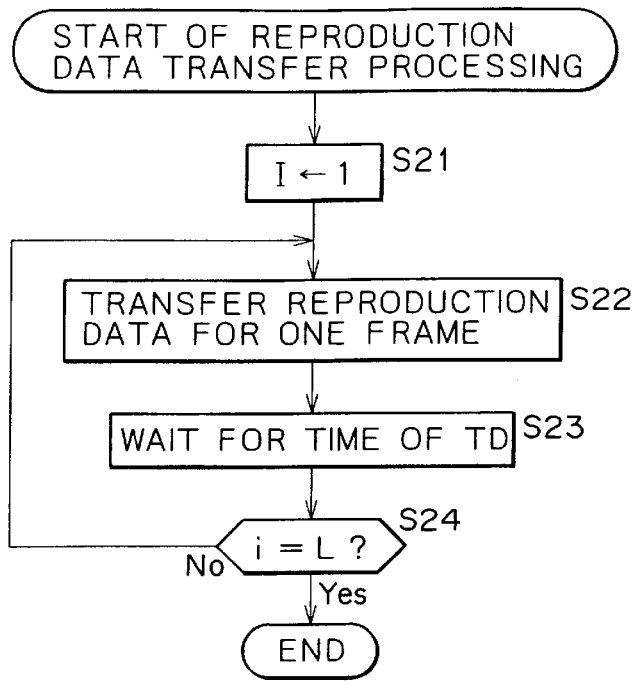
F I G. 6
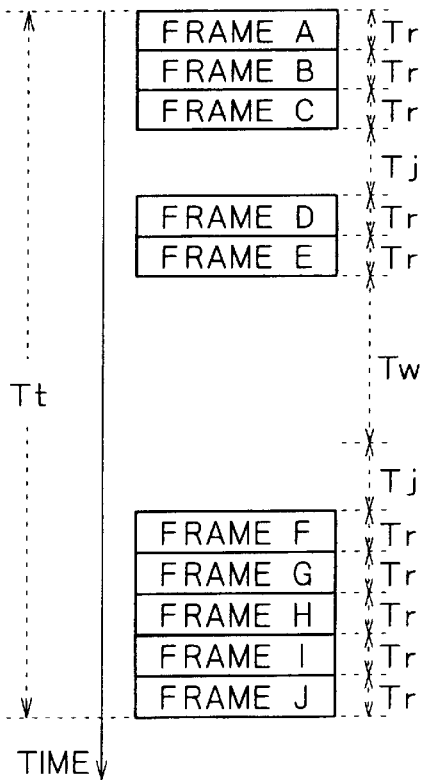
F I G. 7
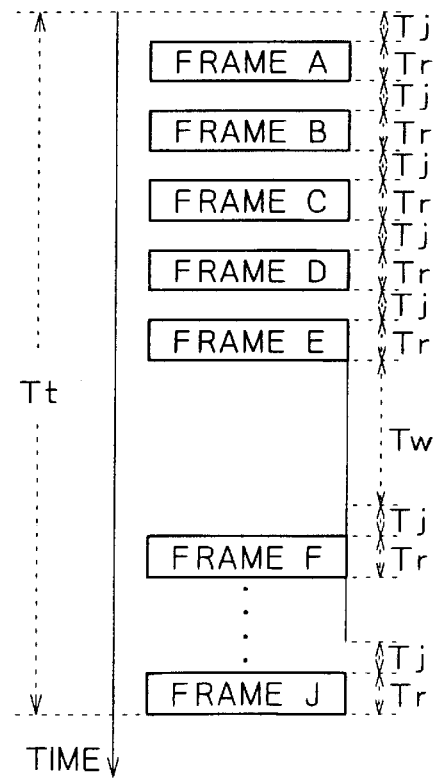

INFORMATION PROCESSING APPARATUS AND METHOD AS WELL AS PROVIDING MEDIUM

BACKGROUND OF THE INVENTION

This invention relates to an information processing apparatus and method as well as a providing medium, and more particularly to an information processing apparatus and method as well as a providing medium by which reproduction data can be reproduced in a fixed period.

When an information recording and reproduction apparatus in which an optical disk or a like medium is employed as a recording medium is used to write and reproduce information such as video data inputted thereto, since writing into and reading out from a single recording medium cannot be performed simultaneously, it is a possible idea to store such information into a recording buffer and a reproduction buffer built in the recording and reproduction apparatus and perform recording and reproduction alternately. Such processing as just described is hereinafter referred to as simultaneous recording and reproduction processing.

For example, after recording data are stored into the recording buffer to its full capacity or buffer size, recording processing is started and the recording data stored in the recording buffer are read out and written onto the recording medium. During the writing operation, no reproduction processing is performed. After the recording data stored in the recording buffer are read out until no stored recording data remains in the recording buffer, the recording processing is stopped, and reproduction processing is started.

FIG. 6 schematically illustrates data stored in a reproduction buffer in accordance with simultaneous recording and reproduction processing.

In the data illustrated in FIG. 6, three frames A to C are successively recorded each for a time period Tr, and then after time Tj elapses, two frames D and E are successively stored each for a time period Tr. Further, after time Tw and time Tj elapse, five frames F to J are successively stored. In other words, for a time period Tt, the ten frames A to J are stored into the reproduction buffer.

The time Tr is a time within which reproduction data for one frame are read out from the recording medium, and the time Tj is a time within which the optical pickup moves to a reading position of a frame recorded on a different track.

The time Tw is a time within which recording data are written onto the recording medium, that is, a time within which no reproduction processing is performed. In this instance, when reproduction data for five frames are stored into the recording buffer, then the storage capacity of the recording buffer is fully occupied, and as a result, recording processing is started and reproduction processing is stopped as described above.

FIG. 7 schematically illustrates some other data stored into the reproduction buffer. The data here are data stored in the reproduction buffer in a condition wherein variable speed reproduction is performed during simultaneous recording and reproduction processing.

After time Tj elapses, one frame A is stored within time Tr, and then after time Tj elapses again, the second frame B is stored within time Tr. Thus, the operation of storing one frame within each time Tr after time Tj elapses in this manner is repeated until the frames A to E are stored, and then when time Tw elapses further, the operation of storing one frame within time Tr after time Tj elapses is repeated until next five frames F to J are stored.

The reproduction data stored in the reproduction buffer in such a manner as described above are subsequently subject to processing such as decoding and are displayed as an image on a display unit such as a monitor. Thus, if the reproduction data are reproduced at timings corresponding to such timings as illustrated in FIG. 6 or 7 (at timings at which the individual frames are stored), then, for example, within the time Tw, no reproduction data are outputted for a comparatively long period of time and an image is displayed in a stationary state. Consequently, the conventional simultaneous recording and production processing is disadvantageous in that the user may have an unfamiliar feeling to such a stationary image and feel disagreeable.

SUMMARY OF THE INVENTION

It is therefore an object of the present invention to provide an information processing apparatus and method as well as a providing medium by which reproduction data can be reproduced in a fixed period.

In order to attain the object described above, according to an aspect of the present invention, there is provided an information processing apparatus, comprising first calculation means for calculating a reproduction time per a unit amount of reproduction data from a recording medium, second calculation means for calculating a reproduction data reproduction period for reproducing the reproduction data at fixed intervals based on the reproduction time calculated by the first calculation means, and reproduction means for reproducing the reproduction data based on the reproduction data reproduction period calculated by the second calculation means.

According to another aspect of the present invention, there is provided an information processing method, comprising a first calculation step of calculating a reproduction time per a unit amount of the reproduction data, a second calculation step of calculating a reproduction data reproduction period for reproducing the reproduction data at fixed intervals based on the reproduction time calculated in the first calculation step, and a reproduction step of reproducing the reproduction data based on the reproduction data reproduction period calculated in the second calculation step.

According to a first aspect of the present invention, there is provided a providing medium which provides a computer-readable program for causing an information processing system to execute a process comprising a first calculation step of calculating a reproduction time per a unit amount of the reproduction data, a second calculation step of calculating a reproduction data reproduction period for reproducing the reproduction data at fixed intervals based on the reproduction time calculated in the first calculation step, and a reproduction step of reproducing the reproduction data based on the reproduction data reproduction period calculated in the second calculation step.

With the information processing apparatus, the information processing method and the providing medium, a reproduction time per unit amount of reproduction data is calculated and a reproduction data reproduction period for reproducing the reproduction data at fixed intervals is calculated based on the thus calculated reproduction time, and then the reproduction data are reproduced based on the thus calculated reproduction data reproduction period. Consequently, the reproduction data can be reproduced at the fixed intervals.

The above and other objects, features and advantages of the present invention will become apparent from the following description and the appended claims, taken in con-

BRIEF DESCRIPTION OF THE DRAWINGS

FIG. 1 is a block diagram showing an example of construction of an information recording and reproduction apparatus to which the present invention is applied;

FIG. 2 is a diagrammatic view illustrating data stored on a disk;

FIG. 3 is a diagrammatic view illustrating a TOC of the disk;

FIG. 4 is a flow chart illustrating reproduction data transfer period calculation processing of the information recording and reproduction apparatus of FIG. 1;

FIG. 5 is a flow chart illustrating reproduction transfer processing of the information recording and reproduction apparatus of FIG. 1;

FIG. 6 is a diagrammatic view illustrating data stored in a reproduction buffer; and FIG. 7 is a similar view but illustrating some other data stored into a reproduction buffer.

DESCRIPTION OF THE PREFERRED EMBODIMENT

Referring first to FIG. 1, there is shown an example of a construction of a disk recording and reproduction apparatus to which an information processing apparatus of the present invention is applied. A disk 1 is loaded into a disk recording and reproduction apparatus 5. A reproduction apparatus 21 of the disk recording and reproduction apparatus 5 reads out data from the disk 1 thus loaded and outputs the data to a demodulator 25. The reproduction apparatus 21 is, for example, a pickup where the disk 1 is an optical disk, and positioning servoing, disk rotation servoing and so forth of the reproduction apparatus 21 are controlled by a central processing unit (CPU) 23. The CPU 23 refers to a TOC (Table Of Contents), which will be hereinafter described, stored in a random access memory (RAM) 22 and controls operation of the reproduction apparatus 21. Here, it is assumed that the data recorded on the disk 1 are video data encoded using the MPEG (Moving Picture Experts Group) 2.

A DMA (Direct Memory Access) controller 24 is controlled by the CPU 23 and causes video data demodulated by the demodulator 25 to be transferred to a reproduction buffer 26 and further to a decoder 27. The decoder 27 is an MPEG 2 decoder and decodes the video data transferred thereto from the reproduction buffer 26. The decoded video data are transferred to an NTSC (National Television System Committee) encoder 28 in response to an instruction of the DMA controller 24 and encoded into video data of the NTSC system by the NTSC encoder 28. Then, the encoded data are transferred to and displayed on a display unit 10.

Referring now to FIG. 2, there is illustrated a manner of video data recorded on the disk 1. Particularly, FIG. 2 schematically illustrates a manner wherein a drama 0-0, a commercial message 0-1 and another dram 0-2 are recorded on the disk 1. In FIG. 2, the file of the drama 0-0 is recorded in two separate fractions. In particular, it can be seen that the file of the drama 0-0 is successively recorded on sectors 0 to 4 and, after sector jumping to sector 11, successively recorded on sectors up to sector 13. Similarly, the CM (commercial message) 0-1 is successively recorded on sectors 14 to 17, and the drama 0-2 is successively recorded on sectors 18 to 21 and, after sector jumping to sector decoder 27, successively recorded on sectors up to sector 29.

FIG. 3 illustrates a TOC (Table Of Contents) recorded on the disk 1 on which the files illustrated in FIG. 2 are recorded, or in other words, a TOC stored in the RAM 22. The TOC usually has such a hierarchical structure as shown in FIG. 3 and includes, in order from the top layer, a "time code", a "file name", a "position from the top", "characteristic point information", a "sector number", "link information" and a "physical address". The "time code" has start times and end times of the files recorded therein. The "file name" has a name of each file stored therein, and a user can record a desired name into the "file name". The "position from the top" indicate an offset in the form of a byte number of each file from the top on the disk 1, and the "characteristic point information" indicates types and numbers of pictures of the MPEG 2 included in the sectors of each file.

The "sector number" indicate sector numbers of each file, and the "link information" indicates a sector number to which sector jumping is to be performed after a sector in question comes to an end or the end (fff) of each file. The "physical address" indicates positions of the disc 1 (defined by a track number and an address in the track) corresponding to each sector number.

For example, the start time of the drama 0-0 is "00:00:00:00" and the end time is "00:05:02:15". Further, the sectors of the sector numbers 0 to 4 are linked, and the sectors beginning with the sector of the sector number 11 are linked to them. Thus, the sectors of the sector numbers 11 to 13 are linked, and the link of the file of the drama 0-0 comes to an end with the sector 13 according to the link information is "fff". Further, it can be seen from the characteristic points that the drama 0-0 is composed of one I (Intra) picture, six B (Bidirectionally Predictive) pictures and three P (Predictive) pictures. Accordingly, for example, when the sector of the sector number 0 is to be reproduced, the address 0 of the track 0 is set to the reproduction apparatus 21 in accordance with information recorded at the physical address, and then reading is started.

Subsequently, a processing procedure for calculating a reproduction data transfer period TD when such reproduction data stored in the reproduction buffer 26 as illustrated in FIGS. 6 and 7 are to be transferred to the decoder 27 will be described with reference to a flow chart of FIG. 4.

In step S1, the CPU 23 reads out the TOC of data to be reproduced from the RAM 22 and detects a frame number L of the reproduction data. It is to be noted that reading out of the TOC is executed when the disk 1 is loaded first into the apparatus, and the thus read out TOC is stored into the RAM 22.

In step S2, the CPU 23 calculates a sum total of reproduction times Tr for L frames in accordance with the following expressions:

$$\text{Time } Tr = Br \div Rr$$

$$\text{Total of times } Tr = Tr \times L$$

The bit amount $Br$ is an amount of bits of each frame. The bit rate $Rr$ represents a bit rate at which the reproduction data are recalled from the disk 1.

Then in step S3, the CPU 23 calculates a sum total of times Tj when the reproduction data for the L frames are read out in accordance with the following expressions:

$$\text{Time } Tj = \alpha Dt + Dw$$

$$\text{Total of times } Tj = Tj \times M$$

where $Dt$ is the difference between the track numbers on the disk 1, $Dw$ is the waiting time for rotation which provides an offset, and M is the number of movements of the reproduction apparatus 21 between tracks when the reproduction data for the L frames are read out. In the example illustrated in FIG. 6, M=2, but in the example illustrated in FIG. 7, M=10 and M=L. The movement number M is calculated in advance from the addresses on the disk 1 of the reproduction data stored in the TOC.

In step S4, the CPU 23 calculates a sum total of the times Tw when the reproduction data for the L frames are read out in accordance with the following expressions:

Time $Tw=Bf \div Rw$

Total of times $Tw=(Bf \div Rw) \times N$ where Bf is the buffer size of the recording buffer, Rw is the write rate onto the disk 1, and N is the number of times of waiting for reproduction processing when the reproduction data for the L frames are read out. In the examples illustrated in FIGS. 6 and 7, N=1. It is to be noted that the time number N is calculated in accordance with the following expression:

$N$=bit amount of reproduction data for L frames$\div$Bf

Here, the fraction is rounded down.

Then in step S5, the CPU 23 adds the sum total of the times Tr calculated in step S2, the sum total of the times Tj calculated in step S3 and the sum total of the times Tw calculated in step S4 in accordance with the following expression to calculate a time Tt:

Time $Tt$=total of times $Tr$+total of times $Tj$+total of times $Tw$

Then in step S6, the CPU 23 divides the time Tt calculated in step S5 by the frame number L detected in step S1 in accordance with the following expression to calculate a reproduction data transfer period TD:

Reproduction data transfer period $TD=Tt \div L$

Now, a processing procedure when the reproduction data are transferred to the decoder 27 in accordance with the reproduction data transfer period TD calculated in such a manner as described above is described is with reference to a flow chart of FIG. 5.

First in step S21, the CPU 23 initializes the value of a counter i for counting the number L of frames transferred to the decoder 27 to "1". Then in step S22, the CPU 23 controls the DMA controller 24 to transfer the reproduction data for one frame to the decoder 27.

Then in step S23, the CPU 23 waits for a time corresponding to the reproduction data transfer period TD. After the time corresponding to the reproduction data transfer period TD elapses, the control of the CPU 23 advances to step S24. In step S24, the CPU 23 determines whether or not the count value of the counter i is equal to the number (i=L) of frames transferred to the decoder 27. If the CPU 23 determines that the counter i is not equal to the frame number L, the control of the CPU 23 returns to step S22. Consequently, the operation in steps S22 and S23 are repetitively executed until i=L is determined in step S24, that is, until the reproduction data for the L frames are all transferred to the decoder 27. If it is determined in step S24 that i=L, then the processing is ended.

It is to be noted that the reproduction data transferred to the decoder 27 are processed by the decoder 27 and the NTSC encoder 28 and displayed on the display unit 10 at the timings at which they are transferred.

It is to be noted that, as a providing medium for providing a computer program for execution of such processing as described above to a user, a recording medium such as a magnetic disk, a CD-ROM or a solid-state memory or a communication medium such as a network or an artificial satellite can be utilized.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus, comprising:

first calculation means for calculating a reproduction time per a unit amount of reproduction data from a recording medium;

second calculation means for calculating a reproduction data reproduction period for reproducing the reproduction data at fixed intervals based on the reproduction time calculated by said first calculation means; and reproduction means for reproducing the reproduction data based on the reproduction data reproduction period calculated by said second calculation means.

2. An information processing apparatus according to claim 1, wherein said first calculation means includes means for calculating a data reproduction time per the unit amount of the reproduction data, and means for calculating a seek time for the unit amount of the reproduction data.

3. An information processing apparatus according to claim 1, further comprising recording means for recording data onto the recording medium, and wherein recording and reproduction of data onto and from the recording medium are performed alternately.

4. An information processing apparatus according to claim 3, wherein said first calculation means includes means for calculating a data reproduction time per the unit amount of the reproduction data, means for calculating a seek time per the unit amount of the reproduction data, and means for calculating a time required for the recording per the unit amount of data by said recording means.

5. An information processing method, comprising:

a first calculation step of calculating a reproduction time per a unit amount of the reproduction data;

a second calculation step of calculating a reproduction data reproduction period for reproducing the reproduction data at fixed intervals based on the reproduction time calculated in the first calculation step; and a reproduction step of reproducing the reproduction data based on the reproduction data reproduction period calculated in the second calculation step.

6. A providing medium which provides a computer-readable program for causing an information processing system to execute a process comprising:

a first calculation step of calculating a reproduction time per a unit amount of the reproduction data;

a second calculation step of calculating a reproduction data reproduction period for reproducing the reproduction data at fixed intervals based on the reproduction time calculated in the first calculation step; and a reproduction step of reproducing the reproduction data based on the reproduction data reproduction period calculated in the second calculation step.

* * * * *